(12) United States Patent
Voirin et al.

(10) Patent No.: US 12,187,184 B2
(45) Date of Patent: Jan. 7, 2025

(54) METHOD FOR GENERATING A DEFAULT LIGHTING INSTRUCTION, LIGHTING SYSTEM, COMPUTER PROGRAM

(71) Applicant: VALEO VISION, Bobigny (FR)

(72) Inventors: Patrice Voirin, Bobigny (FR); Feng Yang, Bobigny (FR); Houssem Kouki, Bobigny (FR); Eric Donnat, Bobigny (FR); Rodrigo Carbonell, Bobigny (FR)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 17/763,234

(22) PCT Filed: Sep. 24, 2020

(86) PCT No.: PCT/EP2020/076637
§ 371 (c)(1),
(2) Date: Oct. 17, 2022

(87) PCT Pub. No.: WO2021/058609
PCT Pub. Date: Apr. 1, 2021

(65) Prior Publication Data
US 2023/0062241 A1 Mar. 2, 2023

(30) Foreign Application Priority Data
Sep. 27, 2019 (FR) ...................................... 1910734

(51) Int. Cl.
*B60Q 1/14* (2006.01)
*F21S 41/153* (2018.01)
(52) U.S. Cl.
CPC ............ *B60Q 1/143* (2013.01); *F21S 41/153* (2018.01)

(58) Field of Classification Search
CPC .... B60Q 1/143; B60Q 11/002; B60Q 11/005; B60Q 1/14; B60Q 11/00; F21S 41/153;
(Continued)

(56) References Cited

U.S. PATENT DOCUMENTS 6,817,741 B2  11/2004  Toda et al.
7,064,498 B2*  6/2006  Dowling ................ H05B 7/155
                                              362/139
(Continued)

FOREIGN PATENT DOCUMENTS

CN     110234539 A     9/2019
DE  102017130561 A1 *  6/2019
(Continued)

OTHER PUBLICATIONS

European Patent Office, International Search Report and Written Opinion of corresponding International Application No. PCT/EP2020/076637, dated Nov. 18, 2020.
(Continued)

*Primary Examiner* — Abdullah A Riyami
*Assistant Examiner* — Syed M Kaiser
(74) *Attorney, Agent, or Firm* — Valeo Vision

(57) ABSTRACT

The invention relates to a method for generating a default lighting instruction for a lighting module for a motor vehicle, the lighting module including a matrix light source having a plurality of elementary light sources, and a control module of a motor vehicle. The invention also relates to a lighting system and a computer program.

20 Claims, 2 Drawing Sheets

(58) Field of Classification Search
CPC .... F21S 41/663; G01M 11/064; G01M 11/06; H05B 45/10; H05B 47/155; H05B 47/17
See application file for complete search history.

(56) References Cited

U.S. PATENT DOCUMENTS

| | | | |
|---|---|---|---|
| 7,659,674 B2* | 2/2010 | Mueller | H05B 45/3577 |
| | | | 315/307 |
| 9,821,704 B2 | 11/2017 | Fendt | |
| 10,005,384 B2 | 6/2018 | Canonne et al. | |
| 10,889,241 B2 | 1/2021 | Faivre et al. | |
| 10,894,503 B2 | 1/2021 | Spero | |
| 2015/0035440 A1* | 2/2015 | Spero | F21S 41/147 |
| | | | 315/153 |
| 2017/0135165 A1* | 5/2017 | Lu | H05B 45/20 |
| 2019/0116345 A1 | 4/2019 | Albou et al. | |
| 2019/0200427 A1 | 6/2019 | Albou et al. | |
| 2019/0264885 A1 | 8/2019 | Lefaudeux et al. | |
| 2019/0268071 A1 | 8/2019 | Lydecker et al. | |
| 2020/0084854 A1* | 3/2020 | Bonne | H05B 45/10 |
| 2020/0265777 A1* | 8/2020 | Shigeta | G09G 3/2014 |
| 2022/0246585 A1* | 8/2022 | Kim | H01L 33/502 |

FOREIGN PATENT DOCUMENTS

| | | |
|---|---|---|
| FR | 3055980 A1 | 3/2018 |
| FR | 3072531 A1 | 4/2019 |
| JP | 2003040029 A | 2/2003 |
| JP | 2003159983 A | 6/2003 |
| JP | 2004214023 A | 7/2004 |
| JP | 2012096663 A | 5/2012 |
| KR | 20140059506 A | 5/2014 |
| WO | 2019069672 A1 | 4/2019 |

OTHER PUBLICATIONS

Japan Patent Office, Office Action (with English translation) of corresponding Japanese Application No. 2022-519242, dated May 22, 2023.
China Patent Office, Intention to Grant of corresponding Chinese Patent Application No. 202080068096.9, dated Jun. 10, 2024.
China Patent Office, Office Action of corresponding Chinese Patent Application No. 202080068096.9, dated Nov. 30, 2023.

* cited by examiner

10

Send at least some of the calibration data by the data reception/transmission unit to the control module and store in memory.
20

Compute, by a computing unit, a default lighting setpoint, using at least some of the first data and the calibration data.
30

Transmit the default lighting setpoint from the control module to the lighting module.
32

Store the default lighting setpoint in the memory element of the lighting module.
40

Send a current lighting setpoint from the control module to the lighting module, with the current lighting setpoint taking into account the calibration data.
50

Control, by the control unit for the lighting module, the matrix light source responsive to the current lighting setpoint and the calibration data stored in the memory element.
60

Detect, by a detection unit, a fault in the control module or in the lighting module, and control, by the control unit, the matrix light source using the default setpoint when the fault is detected.
70

Fig. 1

METHOD FOR GENERATING A DEFAULT LIGHTING INSTRUCTION, LIGHTING SYSTEM, COMPUTER PROGRAM

CROSS-REFERENCE TO RELATED APPLICATIONS

This application is filed under 35 U.S.C. § 371 U.S. National Phase of International Application No. PCT/EP2020/076637 filed Sep. 24, 2020 (published as WO2021058609), which claims priority benefit to French application No. 1910734 filed on Sep. 27, 2019, the disclosures of which are herein incorporated by reference in their entirety.

TECHNICAL FIELD

The invention relates to lighting modules for motor vehicles. In particular, the invention relates to such modules involving matrix light sources.

BACKGROUND OF THE INVENTION

A light-emitting diode (LED) is a semiconductor electronic component capable of emitting light when it is subjected to an electric current having at least one threshold intensity. In the automotive field, LED technology is increasingly being used for numerous light signaling solutions. LED matrices are of particular interest in the field of automotive lighting. Matrix light sources can be used for "leveling"-type functions, i.e. adjusting the height of the emitted light beam according to the attitude of the vehicle and the profile of the road. Other applications include DBL ("digital bending light") which corresponds to adjusting the direction of the emitted light beam in order to follow the road in the horizontal plane, ADB ("adaptive driving beam") which corresponds to an anti-dazzle function that generates shaded areas in the light beam emitted by a high beam so as not to disrupt other road users, as well as functions for projecting patterns on the ground using the pixelated light beam.

BRIEF SUMMARY OF THE INVENTION

It is known practice to use light sources with different types of technology for the aforementioned lighting applications. This may include, for example, monolithic technology, according to which a large plurality of LED-type elementary sources, equivalent to pixels, are etched into a common semiconductor substrate. Integrated electrical connections allow the pixels to be activated independently of one another. Another known technology is that of microLEDs, which produces a matrix of LEDs of small size, typically smaller than 150 μm. There are also modules of micromirror, or DMD ("digital micromirror device"), type, which involve a projection technology using an intensity modulator on a uniform beam. Micromirrors, the position of which is controlled by means of piezoelectric elements, are oriented so as to selectively reflect an incident light beam, so that each micromirror corresponds to an elementary source of the pixel matrix thus produced. The light from a source is directed onto the matrix of micromirrors by an optic. This light therefore has a variable distribution from one module to another because of positioning and manufacturing tolerances in the optics and in the light source. This causes a variable maximum intensity from one module to another, for a given pixel. In this case, each pixel will have a different maximum intensity depending on the command transmitted thereto. Such lighting devices are designed using mass production methods. There has to be a certain amount of play between the constituent elements of the lighting and/or signaling device on the one hand to allow easy assembly, and on the other hand because the parts are generally not machined but instead molded in plastic, which allows the production costs to be kept down.

It is worth emphasizing, in particular, the difficulty in perfectly aligning a micromirror matrix with the projection optics portion, which generally comprises at least one lens. Due to the high numerical aperture of the lens used for the projection function, the projection quality of the image decreases significantly if the lateral offset from the optical axis reaches a few micrometers. In practice, projected image distortions are therefore inevitable using solutions known in the prior art. Each projection module of this type has its own set of optical characteristics, in particular geometric aberration characteristics, including optical distortion and spherical aberration properties. During the production of micromirrors, geometric aberrations may be introduced. All of these elements result in non-uniform behavior of the matrix light source.

All of these aforementioned modules have their own characteristics related to the combination of the manufacturing tolerances of the components. During the production of semiconductor components such as LEDs or LED matrices, direct current variations are currently unavoidable. As a result, in a given LED matrix for the same load current, the LEDs emit light beams with variable, non-uniform intensities. While it is possible to correct projection setpoints in order to take into account the electronic and/or optical specificities of a lighting module, when a fault occurs at the lighting module, it is nonetheless important to be able to project a default image that does not dazzle other road users.

One object of the invention is to overcome at least one of the problems posed by the prior art. More precisely, the object of the invention is to propose a lighting module and a control method that make it possible to calibrate the luminous and/or geometric behavior of the elementary light sources that are grouped together in a matrix light source of a motor vehicle when a failure is detected. The aim is to provide the means for producing a uniform light beam that conforms to a predetermined setpoint, independently of the instance of the matrix light source installed in the lighting module.

According to a first aspect of the invention, a method for generating a default lighting setpoint for a lighting module for a motor vehicle is proposed. The lighting module comprises a matrix light source grouping together a plurality of elementary light sources, and a data reception and transmission unit for receiving/sending data from/to a control module for the motor vehicle. The control module comprises first data relating to the motor vehicle. The lighting module further comprises a control unit intended to control said matrix light source, and a memory element comprising second calibration data relating to said matrix light source. The method includes computing, by a computing unit, a default lighting setpoint, using at least some of the first data and the calibration data and storing the default lighting setpoint in the memory element of the lighting module.

Preferably, the method may comprise the preliminary step of sending at least some of the second calibration data by means of the data transmission unit to the control module for the motor vehicle. Preferably, the computing unit may form part of said control module, and the method may preferably further comprise, before step b), transmitting the default lighting setpoint from the control module to the lighting module.

The method may preferably comprise the step of storing, at the control module, the received second calibration data in a memory element, in order to reuse them later.

Preferably, the method may comprise a subsequent step of sending a lighting setpoint from the control module to the lighting module, the transmitted lighting setpoint taking into account said calibration data.

Preferably, the method may comprise the preliminary step of receiving at least some of the first data relating to the motor vehicle by means of the data reception unit from the control module for the motor vehicle. The computing unit may preferably form part of said lighting module.

The method may preferably comprise a subsequent step of receiving a lighting setpoint from the control module at the lighting module, and a step of controlling, by means of the control unit for the lighting module, the matrix light source according to said lighting setpoint and to the calibration data stored in the memory element of the module.

Preferably, the method may comprise a step of correcting the received lighting setpoint using the calibration data stored in the memory element of the lighting module.

The method may preferably comprise a subsequent step of detecting, by means of a detection unit, a fault at the control module and/or at the lighting module, and of subsequently controlling the matrix source using said default setpoint.

The first data relating to the motor vehicle may preferably comprise data that describe the attitude, the position of the lighting module, the position of other lighting modules, or a combination of the above.

The second calibration data may preferably comprise, for each elementary source, an indication of the light intensity emitted as a function of an electric load current, an indication of a geometric aberration of a light beam that the lighting module is capable of emitting, or a combination of the above.

Preferably, the default lighting setpoint may comprise an image that represents a low-beam headlight cut-off.

Preferably, said lighting setpoint may comprise an elementary setpoint per elementary light source.

Said lighting setpoint may preferably comprise an image. Preferably, at least one pixel of the image may correspond to an elementary light source. The resolution of the image may preferably be higher than the projection resolution of the matrix light source. Preferably, a pixel of the image may correspond to an elementary light source.

At least some of the data exchanged between the control module for the motor vehicle and the control unit for the lighting module may preferably be encrypted and/or signed by means of at least one cryptographic key.

Preferably, a failure at the lighting module and/or at the control module for the motor vehicle may be detected when the decryption of the data is unsuccessful or when said signature cannot be validated.

According to another aspect of the invention, a lighting system for a motor vehicle is proposed. The system is noteworthy in that it comprises a control module for a motor vehicle, the control module comprising first data relating to the motor vehicle, the control module being connected by a data channel to a lighting module which comprises a control unit and a matrix light source as well as a memory element comprising second calibration data relating to said matrix light source. The system is further noteworthy in that the control module and the lighting module are configured to implement the steps of the method according to the preceding aspect of the invention.

The lighting module may preferably comprise a data reception/transmission unit. The data reception and transmission unit may preferably comprise a network interface capable of receiving/sending data over a data bus internal to the motor vehicle. For example, the bus may be an Ethernet bus, a bus of Gigabit Multimedia Serial Link, GMSL, type, or a bus using low-voltage differential signaling, LVDS, technology, such as an FPD-Link III bus.

The control unit may preferably comprise a microcontroller element. The control unit may preferably comprise a chip of field-programmable gate array, FPGA, application-specific integrated circuit, ASIC, or complex programmable logic device, CPLD, type. These elements are configured using an appropriate computer program to implement the described functionalities.

The matrix light source may preferably comprise a monolithic source, comprising elementary light-emitting light sources with semiconductor elements that are etched into a common substrate and are activatable independently of one another.

The matrix light source may preferably comprise a microLED-type matrix, comprising a matrix of elementary sources produced by light-emitting diodes, LEDs, of small size, typically smaller than 150 µm.

The matrix light source may preferably comprise a micromirror device, or DMD (digital micromirror device), in which an elementary source comprises a micromirror in a matrix, which selectively reflects an incident light beam according to its position.

The control unit may preferably be configured to control said matrix light source by correcting said lighting setpoint by means of at least some of said calibration data.

Preferably, the control unit may be configured to transmit at least some of said calibration data to a control module for the motor vehicle.

The lighting module may preferably comprise a second memory element in which data allowing the module to be authenticated are stored. Preferably, the lighting module may comprise a processor programmed to encrypt and/or sign data by means of a cryptographic key stored in said memory element.

According to yet another aspect of the invention, a computer program comprising a sequence of instructions is proposed which, when the instructions are executed by a processor, result in the processor implementing a method according to one aspect of the invention.

According to another aspect of the invention, a non-transitory computer-readable storage medium is proposed, said medium storing a computer program according to the preceding aspect of the invention.

By using the measures proposed by the present invention, it becomes possible to provide a method that makes it possible to store a default lighting setpoint in a lighting module, which takes into account both calibration data specific to the lighting module and data relating to the motor vehicle equipped therewith. These data comprise, for example, the attitude of the motor vehicle, or the position of the lighting module relative to other components of the motor vehicle. This information makes it possible to calibrate a default image, representing, for example, a high-beam headlight cut-off, and to associate it physically with the lighting module. Preferably, this method is carried out when installing the lighting module in the motor vehicle, or when pairing the control module for the motor vehicle on the one hand with the lighting module on the other hand. The aspects of the invention further make it possible to produce a uniform light beam that conforms to a predetermined setpoint, independently of the instance of the matrix light source installed in the lighting module. To achieve this, in accordance with aspects of the invention, it is proposed that the calibration parameters be stored in a memory attached to the lighting module, said parameters comprising, for example, electric current or brightness correction values for each pixel of a matrix source, or geometry corrections for the beam produced by the light module. In this way, it is ensured that the data associated with the module are physically attached thereto, in particular when pairing the lighting module with the motor vehicle. This makes it possible to avoid an additional step of parameterization which might give rise to errors when assembling a vehicle headlamp using the lighting module. By using the measures of the invention, a module may be assembled or changed without software manipulation: for example, there is no need to transfer or update data relating to the module in a memory of the controller for the motor vehicle.

BRIEF DESCRIPTION OF THE DRAWINGS

Other features and advantages of the present invention will be better understood with the aid of the description of the examples and of the drawings, in which:

FIG. 1 shows a method for generating a default lighting setpoint according to one preferred embodiment of the invention.

DETAILED DESCRIPTION OF THE INVENTION

Figure 2:
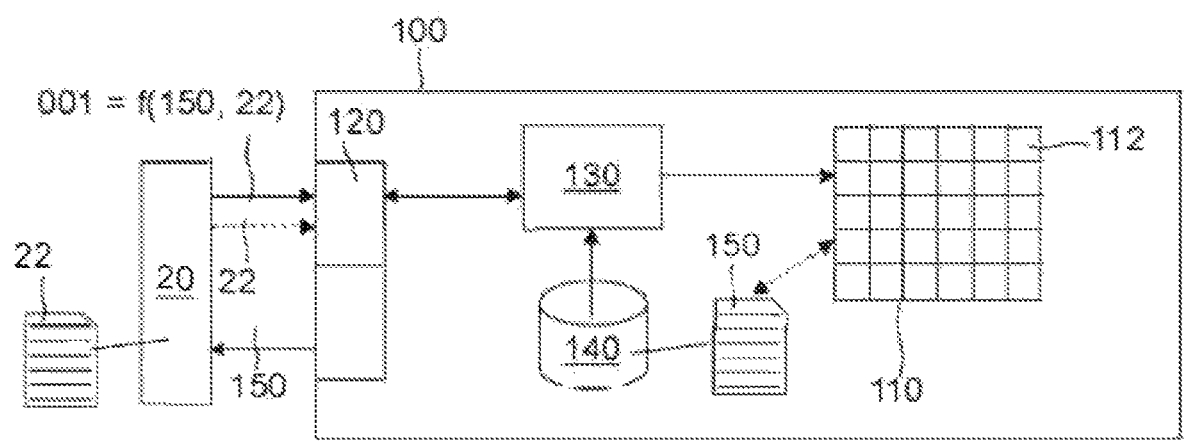
FIG. 2 is an illustration of a lighting system in accordance with one preferred embodiment of the invention.

Unless specified otherwise, technical features that are described in detail for one given embodiment may be combined with the technical features that are described in the context of other embodiments described by way of example and without limitation.

The description focuses on the elements of a lighting module for a motor vehicle that are required to understand the invention. Other elements, which in a known manner form part of such modules, will not be mentioned or described in detail. For example, the presence and operation of a converter circuit involved in supplying electrical power to a matrix light source, known per se, will not be described in detail. The same applies for optical elements such as lenses, for example.

FIG. 1 shows a method 10 for generating a default lighting setpoint according to one embodiment of the invention. In block 20, at least some of the calibration data is sent by the data reception/transmission unit to the control module and stored in memory. In block 30, a computing unit computes a default lighting setpoint, using at least some of the first data and the calibration data. In block 32, the default lighting setpoint is transmitted from the control module to the lighting module. In block 40, the default lighting setpoint is stored in the memory element of the lighting module. In block 50, a current lighting setpoint is sent from the control module to the lighting module, with the current lighting setpoint taking into account the calibration data. In block 60, the control unit for the lighting module controls the matrix light source responsive to the current lighting setpoint and the calibration data stored in the memory element. In block 70, a detection unit detects a fault in the control module or in the lighting module, and the control unit controls the matrix light source using the default setpoint when the fault is detected.

FIG. 2 shows, in a non-limiting manner, a lighting system for a motor vehicle that allows this method to be implemented. The method relates to the generation of a default image and it preferably forms part of a sequence for pairing the motor vehicle with a lighting module. The system comprises in particular a lighting module 100. The module 100 comprises a matrix light source 110 grouping together a plurality of elementary light sources 112. In the example illustrated, this is a matrix of LEDs without, however, the invention being limited to this example. The matrix light source may also be produced by a micromirror device, for which each mirror is designed to generate one elementary light beam of a matrix. The module comprises a data reception and transmission unit 120; this is, for example, an interface capable of receiving and decoding messages over a data bus internal to the motor vehicle, such as a CAN (Controller Area Network) bus.

The data reception unit 120 is capable of receiving/sending data from/to at least one control module for the motor vehicle. The control module 20 includes vehicle data 22 relating to the motor vehicle, such as its attitude, position of the lighting module in the motor vehicle, or other data. The module 100 further includes a memory element 140, such as a flash-type memory, to which a control unit 130 is functionally connected and has read access, and in which calibration data 150 specific to the matrix source 110 are stored. By way of example, the data may comprise, for each elementary light source 112, a value indicating the difference in brightness with respect to the average brightness of the matrix source 110, possibly over a range of load current strengths. The data 150 may nevertheless comprise more complex optical or geometric calibration parameters, without thereby departing from the scope of the present invention.

The exchange of data between the light module 100 and the control module 20 for the motor vehicle after pairing the two modules allows some advantageous applications. In particular, it is proposed to combine the vehicle data 22, such as, for example, orientation, position, or attitude parameters of the vehicle, or information relating to luminous fluxes emitted by other headlights of the vehicle, which are a priori only available at the control module 20, with the calibration data 150, available at the lighting module 100 and specific to the matrix source 110 installed therein. This information is used, according to one preferred embodiment but in a non-limiting manner, by the control module 20 for the motor vehicle to generate a default image or setpoint 001. To do this, the relevant portion of the calibration data 150 is first transmitted from the lighting module 100 to the control module 20, as indicated by the solid arrow in FIG. 2. Indeed, the control module for the motor vehicle generally has greater computing capacity than the control unit 130 for the lighting module.

Alternatively, this computation may be performed by the control unit 130 for the lighting module after a corresponding exchange of the vehicle data 22 required for this computation between the control unit for the motor vehicle on the one hand and the control unit for the lighting module on the other hand, represented by the dashed arrow in FIG. 2.

A default image is an image that is projected by the module when a fault or failure is detected. Thus, the module may preferably comprise an electronic error detection circuit (not illustrated), or a microprocessor programmed for this purpose by a suitable computer program. The error detection circuit is configured to detect, for example, that the data received by the control module for the motor vehicle are inconsistent, or that the connection between the control module for the motor vehicle and the lighting module 100 is no longer reliable. Following this detection of an error, the default image 001 is projected instead of the current setpoint image, with the aim of avoiding potential dazzling of other road users. The default image is generated to take into account the specificities of the matrix light source 110 on the one hand, and of the vehicle equipped therewith on the other hand. Thus, the default image may, for example, be generated precisely and automatically for each motor vehicle and each lighting module with which the vehicle is equipped. Preferably, the default image resulting from this method is transmitted to the lighting module, which stores it permanently in a dedicated memory element. In the event of communication failure between the control module 20 for the motor vehicle and the lighting module 100, the default setpoint then serves as a control for the matrix light source. The default setpoint or image may, for example, correspond to low-beam headlight illumination. In particular, this image may correspond to a low-beam headlight cut-off. Specifically, the cut-off must be well defined in order to satisfy the regulations in force. The precise generation of the default setpoint, taking into account all of the described parameters, makes it possible in particular to prevent other road users from being dazzled when the default setpoint is projected by the lighting module.

According to one preferred embodiment, in the absence of a fault and following pairing of the motor vehicle with the lighting module, the control module 20 may, for example, send a lighting setpoint to the lighting module 100, which is responsible for controlling the matrix light source according to the received setpoint. Such a setpoint may, for example, comprise a brightness value, such as a grayscale level, encoded on a predetermined number of bits, to be produced by each of the elementary light sources 112. The lighting setpoint may therefore be a digital image, and it may in particular be a frame from a stream of such images, constituting a video signal. The control unit 130 is intended to control said matrix light source according to said lighting setpoint. The control unit may be connected to, or comprise, a circuit for driving the electrical power supply for the elementary light sources 112, which is controlled in order to supply the elementary light sources with power in such a way as to implement the lighting setpoint.

In order to ensure uniform light intensity, the control unit 130 adjusts the setpoint values received by the control module 20 by adding thereto or subtracting therefrom the respective differences described in the calibration data 150, before controlling the elementary light sources in accordance with the result. The data 150 may nevertheless comprise more complex optical or geometric calibration parameters, without thereby departing from the scope of the present invention. In such a case, instead of acting only at the level of each light source or at the level of each pixel individually, the correction of the original setpoint may advantageously produce a correction at the level of the entire setpoint, i.e. at the level of the entire image to be projected, or at the level of at least a portion or a region of this image. For example, the image projected without the setpoint correction might exhibit a concave curved appearance due to the projection optics in the vicinity of the projection region. Producing the precorrected setpoint, which takes into account the calibration data including the geometric deformation imposed by the projection optics, results in a projected image exhibiting a geometry closer to the desired, non-curved geometry. To apply a correction for geometric aberrations, a deformation is applied to the entire original setpoint image. As this is discretized, this deformation causes degradation of the information contained in the initial image. It is therefore advantageous for the setpoint image transmitted from the control unit for the vehicle to the control unit to have a resolution higher than the projection resolution of the light module.

The control unit 130 comprises a microcontroller element that has sufficient computing power to correct the setpoint 10, or a stream of setpoints, in real time, by applying the calibration data 150 thereto.

According to one preferred embodiment of the invention, the lighting module is arranged so as to transmit at least some of the calibration data 150, and preferably all of this data, to the control module 20. This is, for example, performed in a phase of initializing the lighting module. In order to guarantee uniform light intensity, the control module 20 takes into account the calibration values 150 thus received in order to determine the setpoint image. For example, the control module 20 adjusts the setpoint values by adding thereto or subtracting therefrom the respective differences before transmitting the result to the lighting module 100. The data 150 may nevertheless comprise more complex optical or geometric calibration parameters, without thereby departing from the scope of the present invention. In this embodiment, the control unit 1230 is freed from the task of correcting the setpoint, and it may be performed by a less expensive microcontroller element that has less computing power.

The exchange of data between the control module 20 for the motor vehicle and the lighting module 100 as defined above also allows an authentication function to be added between the two modules 20 and 100, respectively.

It should be noted that this authentication function may also be implemented independently of the calibration function and/or of the exchange of calibration/attitude data and without the presence of the memory element 140 at the lighting module 200.

The authentication function may, for example, comprise the exchange of public cryptographic keys between the two modules in question, thus allowing the reciprocal verification of the authenticity of data signed by means of the corresponding private cryptographic keys. Alternatively or in addition, the control unit 130 for the lighting module 100 sends an acknowledgment of receipt to the control module 20 for a received data packet, the acknowledgment of receipt comprising a part that allows the microcontroller to be authenticated. The data packet may, for example, contain calibration data, and/or default image data and/or data for generating a default image and/or all or part of an image and/or of a group of images, and/or a packet from a compressed video stream. In one preferred embodiment, this authentication is not performed on all of the packets. In this way, the corresponding computing load is lightened and smoothed out over time. Still alternatively, the authentication function may comprise sending, from the control module 20 for the motor vehicle to the control unit 130 for the lighting module, of a header for a sent data packet, the header comprising a part allowing the control module 20 to be authenticated, the data packet being of the same type as defined above. Advantageously, this authentication is not performed on all of the packets. In this way, the corresponding computing load is lightened and smoothed out over time.

In order to perform the authentication function, the lighting module 100 and the control module 20 for the motor vehicle comprise computing means for generating the header or the acknowledgment of receipt used for authentication, respectively. Preferably, generation is performed according to a time or a date, which may be expressed in any unit of time, for example in milliseconds, or a counter counting exchanges or computing cycles, or another element that changes with the number of exchanges, which may be reset when it exceeds a predefined size.

In the event that authentication between the controller and the microcontroller fails, the lighting function may be put into a communication failure mode. Advantageously, the failure mode is activated only in the event of repeated authentication failures, which makes it possible to avoid activating failure mode if the link has been disrupted, for example by transient electromagnetic interference, which is particularly advantageous in the case of an authentication function using headers or acknowledgments of receipt.

In the case where the control unit 130 comprises a computer, it may implement a data exchange encryption function, in which data encrypted by the control module 20 for the motor vehicle are decrypted by the computer. Advantageously, the computer has a method for determining if the stream has not been decoded correctly. If the stream has not been decoded correctly, the computer may go into a communication failure mode. The communication failure mode may involve the following procedures, taken alone or in combination:

stopping the lighting function or the lighting module projecting a default image, the control module 20 generating a failure signal sent to a central management system of the vehicle, the computer entering an authentication mode in which the computer continues launching an authentication procedure with respect to the computer for the control module 20 (or vice versa). In the authentication mode, the sending of data packets may be interrupted.

It goes without saying that the described embodiments do not limit the scope of the protection of the invention. By referring to the description that has just been given, other embodiments may be contemplated without otherwise departing from the scope of the present invention.

The scope of protection is defined by the claims.

What is claimed is:

1. A method for generating a default lighting setpoint of a lighting module for a motor vehicle, comprising:
   a matrix light source that is configured to group together a plurality of elementary light sources molded in plastic, where each elementary light source is sized about 150 micrometers or less;
   a data reception/transmission unit for receiving or sending data to a control module of the motor vehicle, where the control module includes a first data relating to the motor vehicle, where the first data includes data that describes an attitude of the motor vehicle and a position of the lighting module;
   a control unit for controlling the matrix light source, and a memory element that includes calibration data relating to the matrix light source, the method further including:
   computing a default lighting setpoint by a computing unit using at least some of the first data and the calibration data;
   storing the default lighting setpoint in the memory element of the lighting module.

2. The method of claim 1, further including
   sending at least some of the calibration data by the data reception/transmission unit to the control module with the computing unit included in the control module, and transmitting the default lighting setpoint from the control module to the lighting module.

3. The method of claim 1, further including
   storing at least some of the calibration data into memory at the control module in order to reuse at least some of the calibration data later.

4. The method of claim 1, further including
   sending a current lighting setpoint from the control module to the lighting module with the current lighting setpoint accounting for the calibration data.

5. The method of claim 1, further including
   receiving at least some of the first data by the data reception/transmission unit from the control module wherein the computing unit is included in the lighting module.

6. The method of claim 1, further including
   receiving a current lighting setpoint from the control module implemented by the lighting module, and
   controlling the matrix light source responsive to the current lighting setpoint and the calibration data stored in the memory element implemented by the control unit.

7. The method of claim 6, further including correcting the current lighting setpoint using the calibration data stored in the memory element.

8. The method of claim 1, further including
   detecting a fault in the control module or in the lighting module by a detection unit, and
   controlling the matrix light source using the default setpoint when the fault is detected by the control unit.

9. The method of claim 1, wherein the first data includes data that describes a position of other lighting modules.

10. The method of claim 1, wherein the calibration data incudes an indication of the light intensity emitted as a function of an electric load current, an indication of a geometric aberration of a light beam that the lighting module is capable of emitting or a combination thereof for each of the plurality of elementary light sources.

11. The method of claim 1, wherein the default lighting setpoint includes an image that represents a low-beam headlight cut-off.

12. The method as claimed in claim 5, wherein the at least some of the first data received by the data reception unit is encrypted or signed by at least one cryptographic key.

13. The method as claimed in claim 12, wherein a failure is detected when the decryption of the data is unsuccessful or when the signature cannot be validated.

14. A lighting system for a motor vehicle, comprising:
   a lighting module with a control unit, a matrix light source that is configured to groups a plurality of elementary light sources molded in plastic, where each elementary light source is sized about 150 micrometers or less;
   a memory element with calibration data relating to the matrix light source;
   a control module for the motor vehicle including a first data relating to the motor vehicle, the control module being connected to the lighting module by a data channel;
   where the first data includes data that describes an attitude of the motor vehicle and a position of the lighting module; and
   wherein the lighting module is configured to compute a default lighting setpoint using at least some of the first data and the calibration data and is configured to store the default lighting setpoint in the memory element of the lighting module.

15. The method of claim 14, further including sending at least some of the calibration data by a data reception/transmission unit to the control module with a computing unit included in the control module, and transmitting the default lighting setpoint from the control module to the lighting module.

16. The method as claimed in claim 14, further including storing at least some of the calibration data into memory at the control module in order to reuse at least some of the calibration data later.

17. The method of claim 14, further including sending a current lighting setpoint from the control module to the lighting module with the current lighting setpoint accounting for the calibration data.

18. The method of claim 14, further including detecting a fault in the control module or in the lighting module by a detection unit, and controlling the matrix light source using a default setpoint when the fault is detected by the control unit.

19. The method of claim 14, wherein the first data includes data that describes a position of other lighting modules.

20. The method of claim 14, wherein a default lighting setpoint includes an image that represents a low-beam headlight cut-off.

\* \* \* \* \*